Oct. 23, 1934.  E. WILLIAMS ET AL  1,977,708
POTENTIOMETER RECORDER FOR AUTOMATICALLY RECORDING TEMPERATURE CHANGES
Filed July 3, 1929   8 Sheets-Sheet 1

INVENTORS
Edward Williams
Frank Moore
BY
Harold D. Penney   ATTORNEY

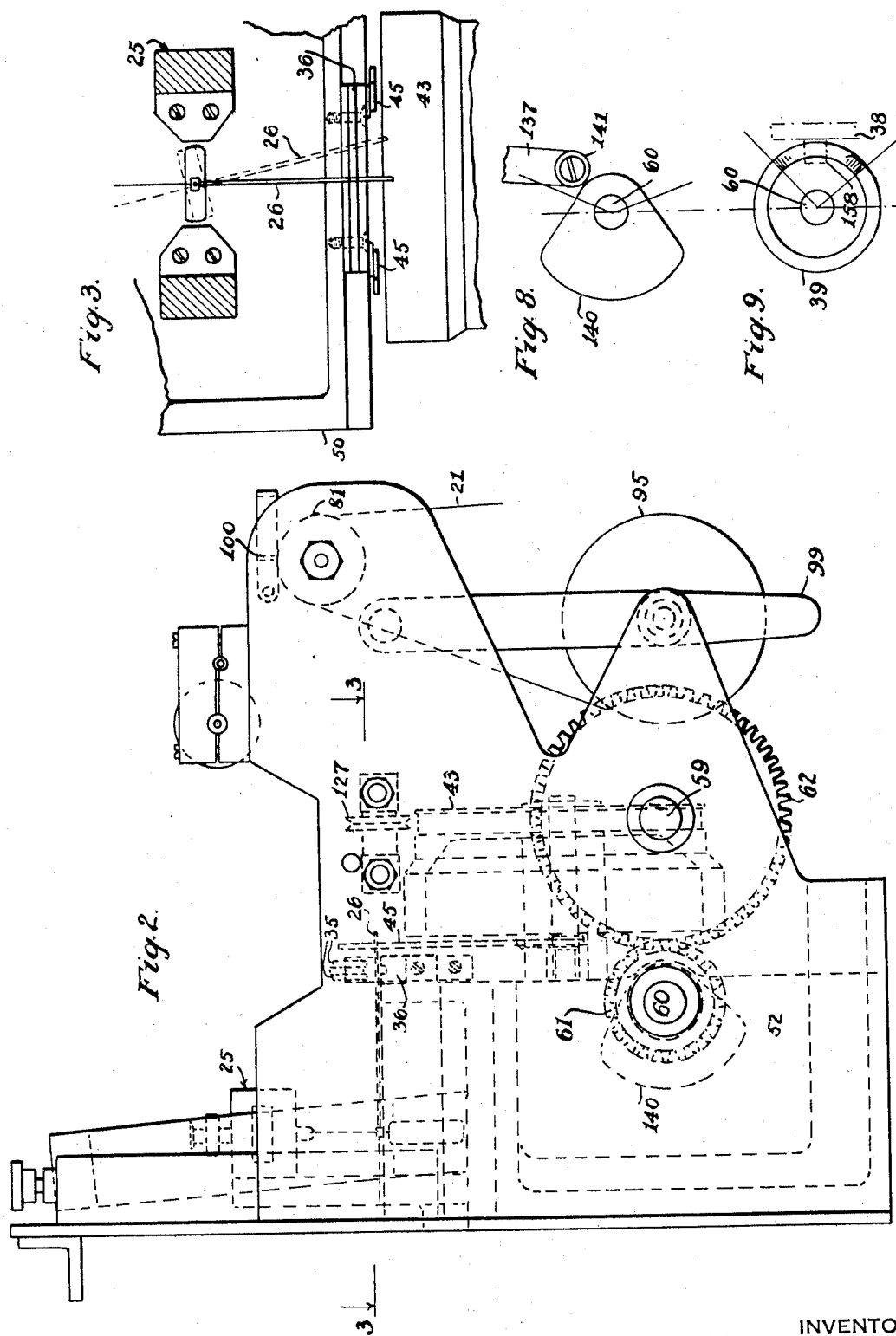

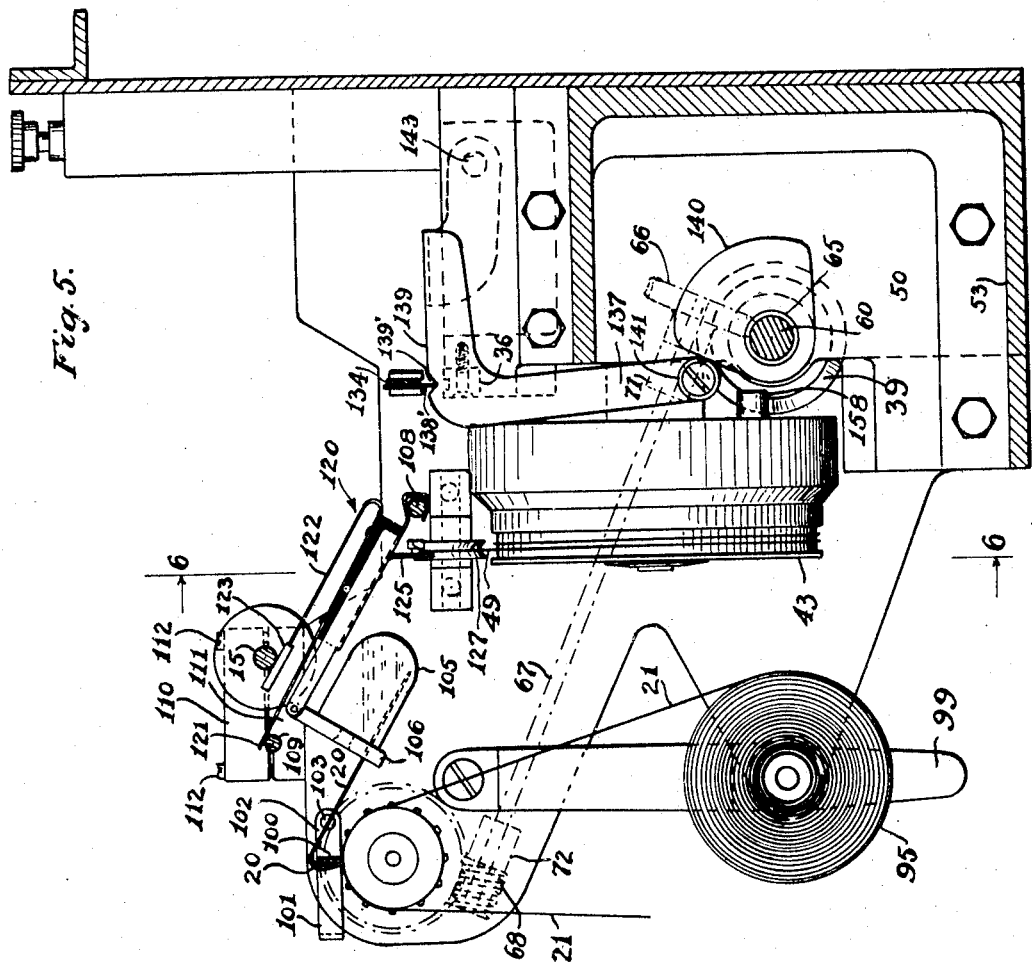

Oct. 23, 1934.  E. WILLIAMS ET AL  1,977,708
POTENTIOMETER RECORDER FOR AUTOMATICALLY RECORDING TEMPERATURE CHANGES
Filed July 3, 1929  8 Sheets-Sheet 4
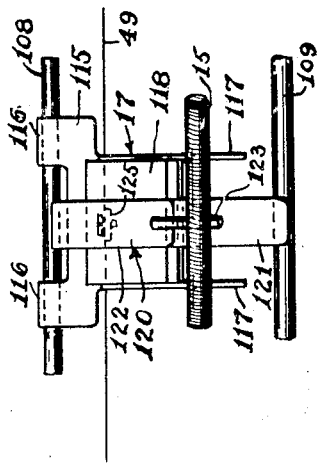
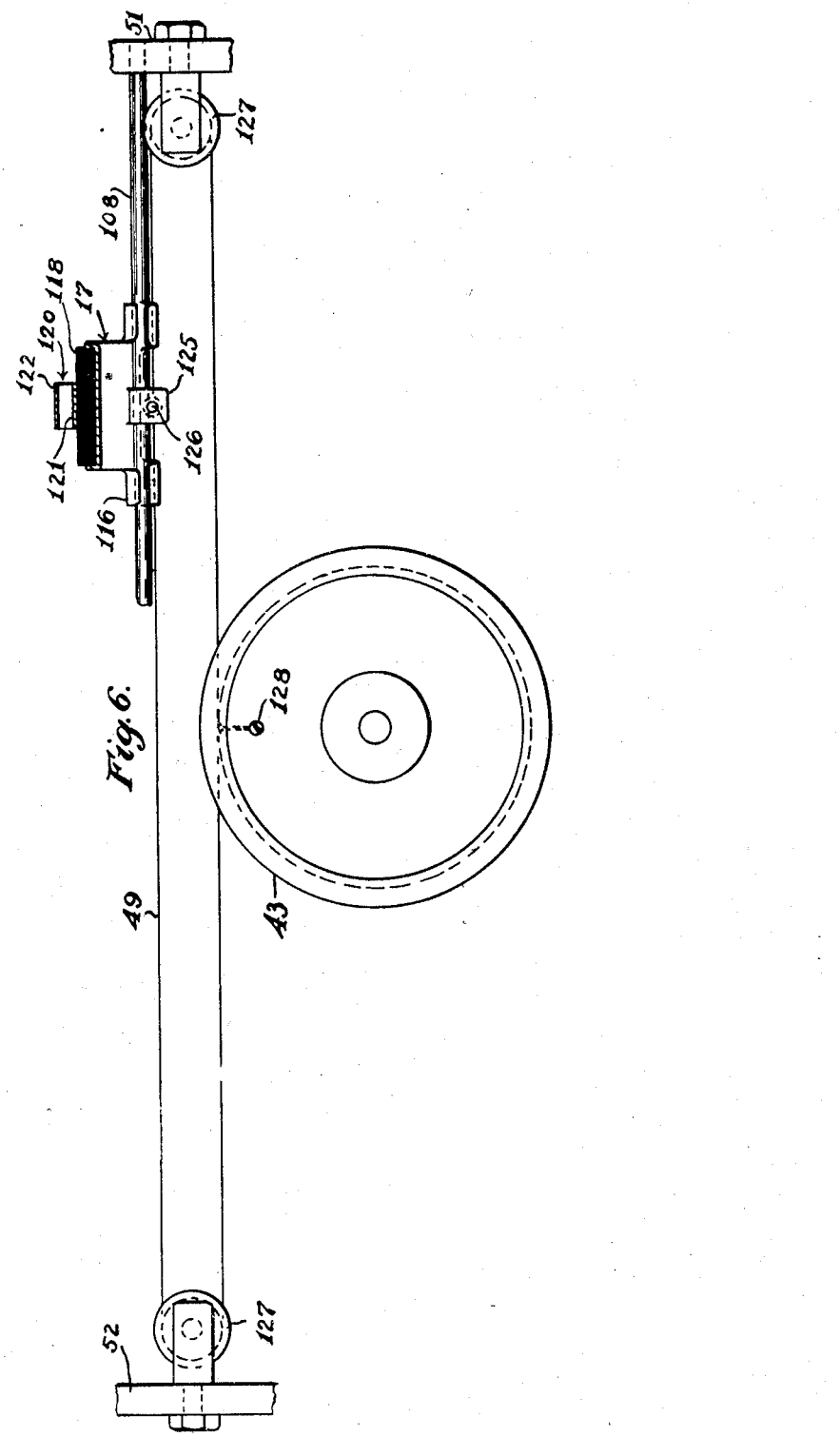
INVENTORS
Edward Williams
Frank Moore
BY
Harold D. Penner
ATTORNEY

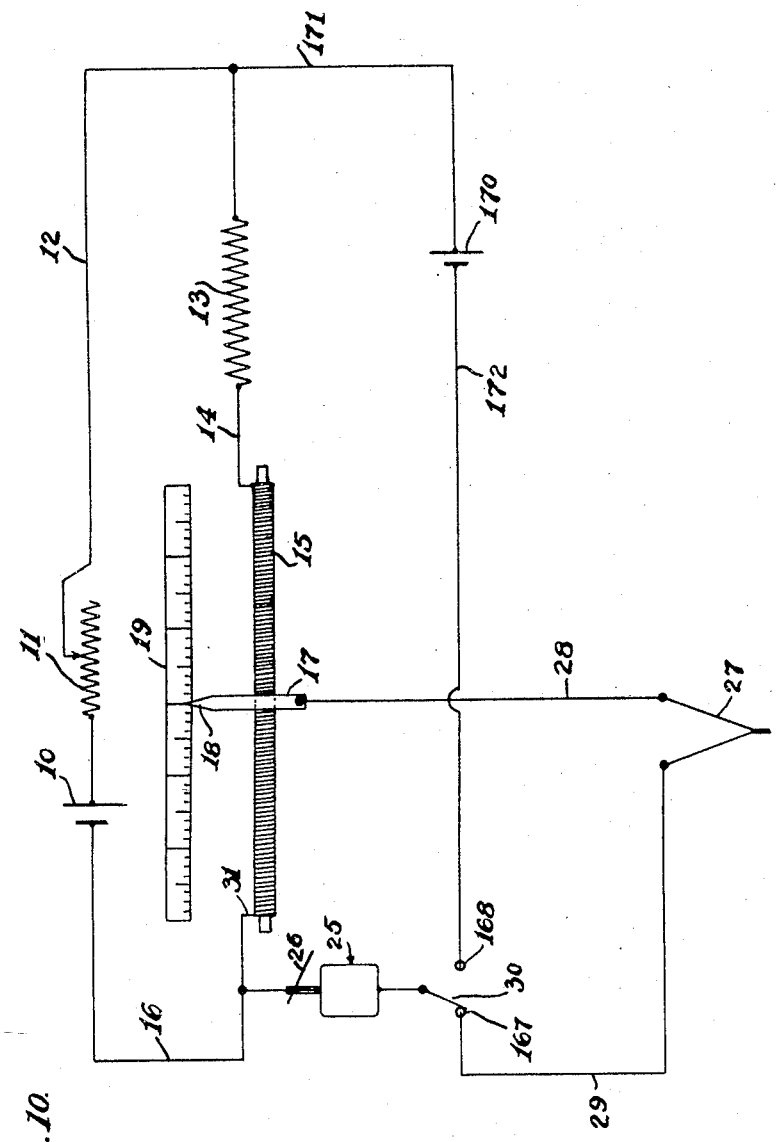

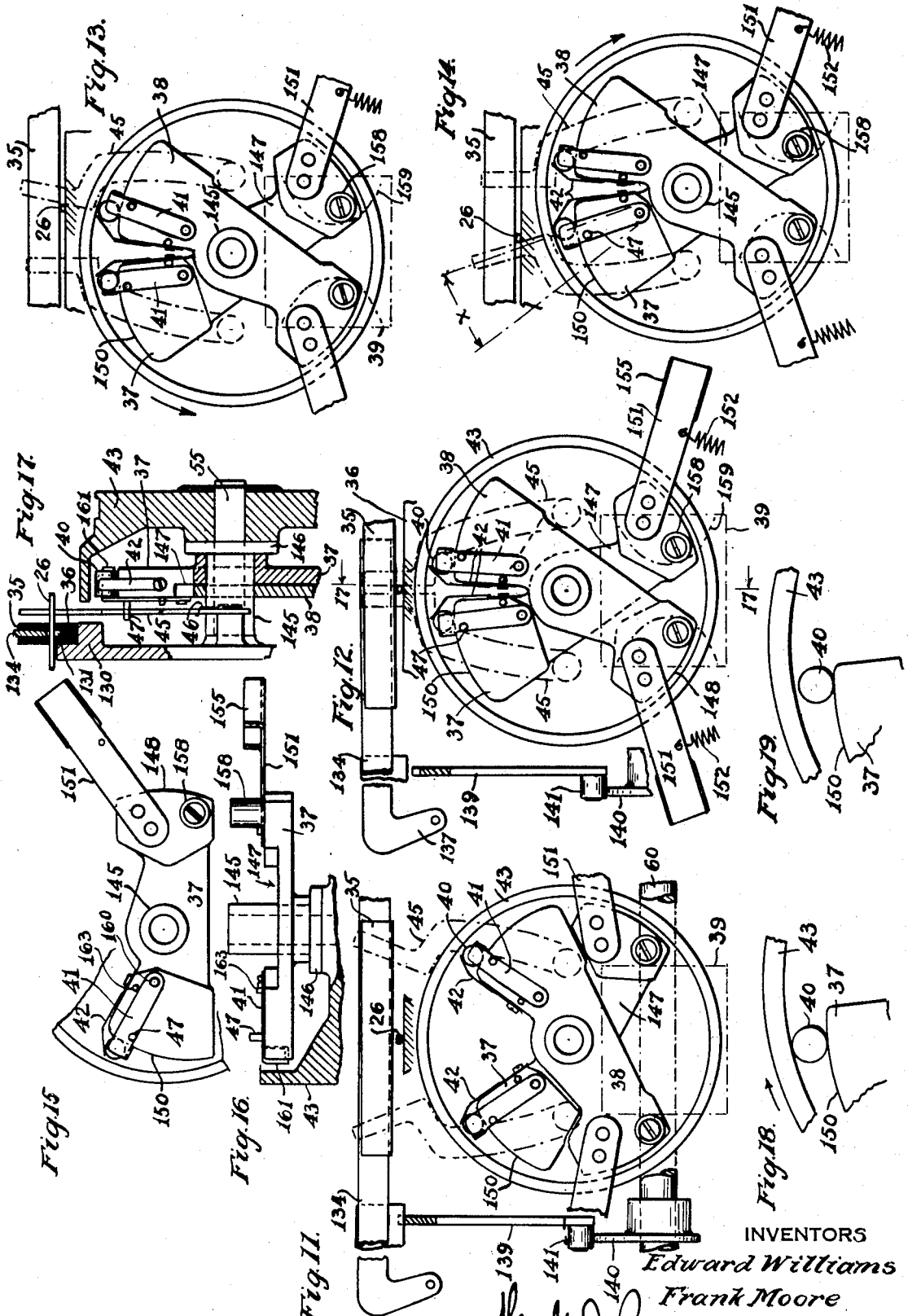

Oct. 23, 1934.　　　E. WILLIAMS ET AL　　　1,977,708
POTENTIOMETER RECORDER FOR AUTOMATICALLY RECORDING TEMPERATURE CHANGES
Filed July 3, 1929　　　8 Sheets-Sheet 7
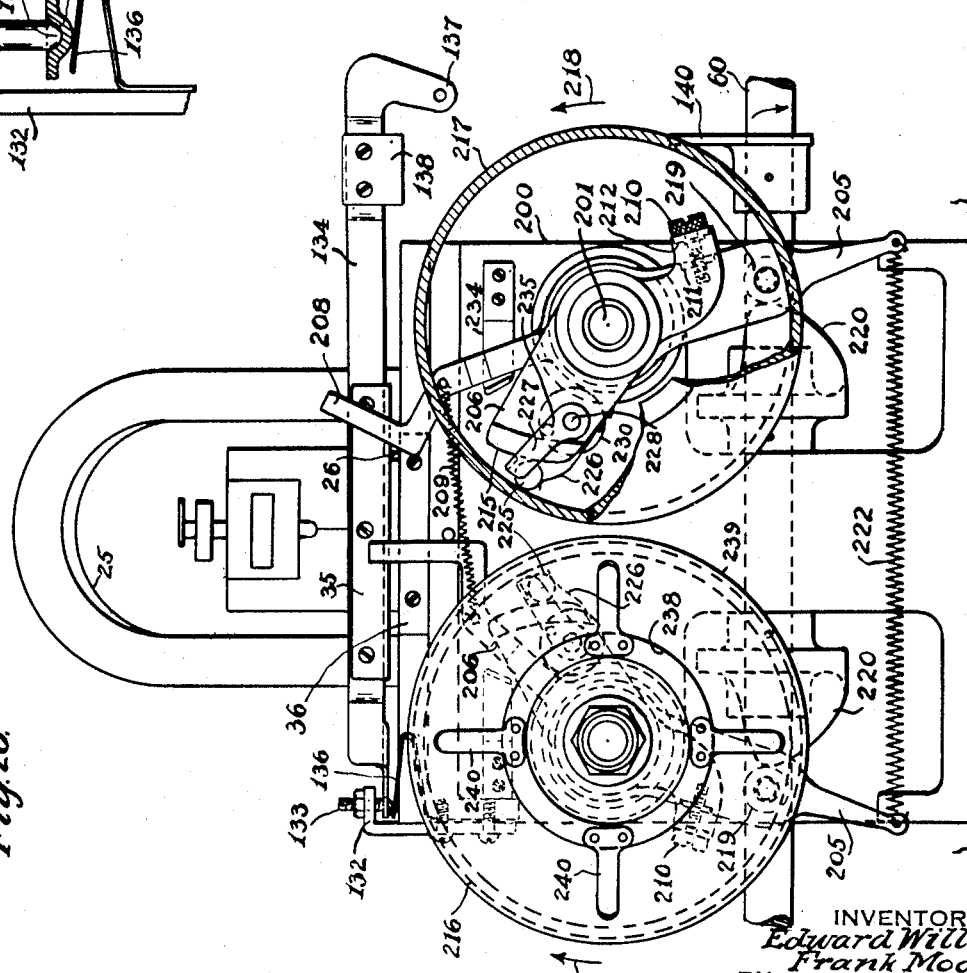
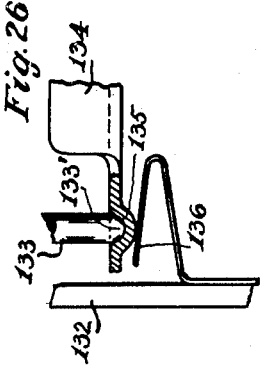
INVENTORS
*Edward Williams*
*Frank Moore*
BY
*Harold D. Penney* ATTORNEY Oct. 23, 1934.  E. WILLIAMS ET AL  1,977,708
POTENTIOMETER RECORDER FOR AUTOMATICALLY RECORDING TEMPERATURE CHANGES
Filed July 3, 1929  8 Sheets-Sheet 8
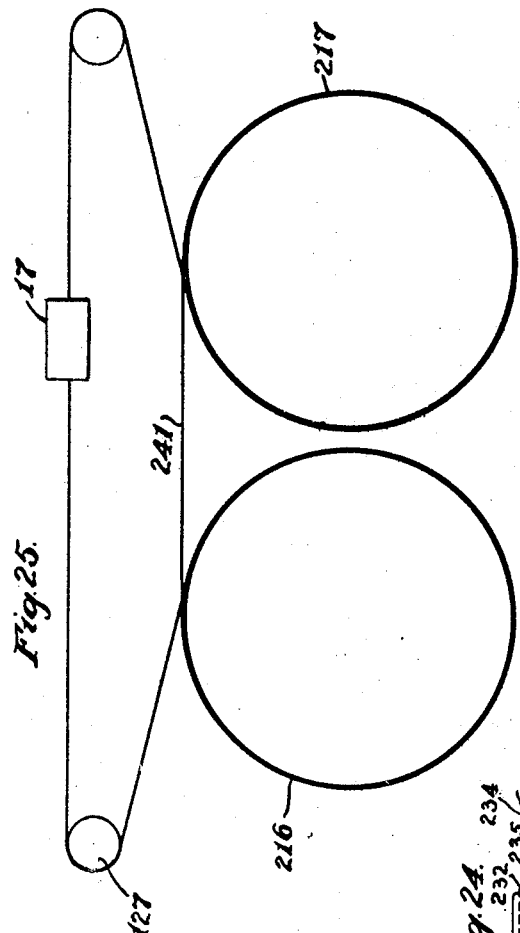
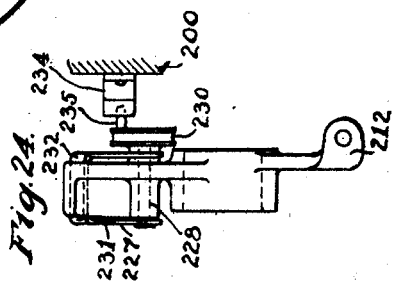
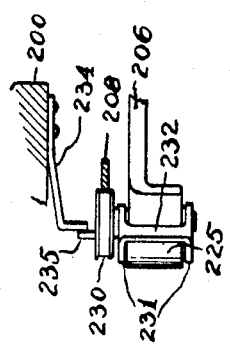
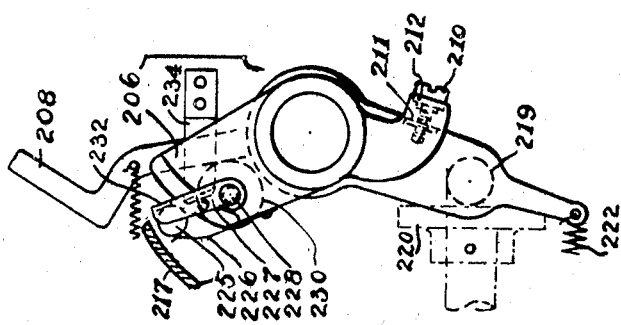
INVENTORS
Edward Williams
Frank Moore.
BY
Harold D. Penney  ATTORNEY Patented Oct. 23, 1934

1,977,708

UNITED STATES PATENT OFFICE 1,977,708

POTENTIOMETER RECORDER FOR AUTOMATICALLY RECORDING TEMPERATURE CHANGES

Edward Williams, Pelham, and Frank Moore, New York, N. Y., assignors to Wilson-Maeulen Company, Inc., New York, N. Y., a corporation of New York Application July 3, 1929, Serial No. 375,864

9 Claims. (Cl. 74—243)

This invention relates to apparatus whereby a delicate device, such as a galvanometer, may control forces for operating a suitable translating device such as a recording instrument, though the invention is not limited to these uses.

The present invention relates particularly to an improved potentiometer recorder for automatically recording temperature changes, and is, for its specific use, adaptable to automatically record industrial furnace temperature changes, although not limited to furnaces nor to temperatures, nor to recording.

The new device is here shown under the control of a thermocouple which in turn influences a galvanometer of the center zero type, although other known instruments or types of galvanometers may be utilized.

One of the objects of the present improvement is to relieve the galvanometer and its delicate deflector member from operational stresses.

Other objects are to provide a control means which controls while the deflector member of the galvanometer is stationary and substantially in its normal path, and to provide an improved clamping means for holding the deflector member stationary.

Another object is to provide a simple, durably constructed mechanism of relatively few parts capable of protracted operation with a minimum of servicing requirements.

Another object is the provision of a simple but effective galvanometer controlled recorder actuating means, whereby such recorder and its appurtenant coacting circuit, contacts and record marking means are accurately controlled to create an autographic record of temperature changes.

A further improvement is in improved means for feeding the paper record strip, such means being provided with adjustments to accommodate the feeding means to variations in the transverse dimensions of the record sheet.

Other objects of the invention are to improve generally the simplicity and efficiency of such apparatus and to provide a device or apparatus of this kind which is economical, durable and reliable in operation, and economical to manufacture.

Still other objects of the invention will appear as the description proceeds; and while herein details of the invention are described and claimed, the invention is not limited to these, since many and various changes may be made without departing from the scope of the invention as claimed in the broader claims.

The inventive features for the accomplishment of these and other objects are shown herein in connection with an improved temperature recorder which, very briefly stated, includes a heat responsive means such as a thermocouple adapted to exert an electromotive force variable in accordance with heat and adapted to be balanced by the force of an adjustable means exerting an opposite electric potential difference for balancing said electromotive force.

Means such as a galvanometer having a deflector member is controlled by current set up by said forces.

A suitable power operated clutch means is controlled by said deflector member for causing the adjustable means to move to balance said forces.

A translating means, such as a scale indicating pointer or marker moved over a scale or moving record sheet, is controlled by said adjustable means.

The invention relates more specifically to the means for controlling the apparatus drive means for causing it to move the driven member. This means includes means for yieldably moving one or more sensing members toward the deflector member of the galvanometer during movement of the drive means, said sensing member being adapted while thus moved to disable the drive means and to be held against further movement by the deflector member when deflected and locked, thereby to hold the sensing member from disabling the drive means, thus causing the drive means to drive the driven member which in turn drives the adjustable means and marker.

The driven member above mentioned may be a clutch drum and the drive means may be pivoted clutch plates carrying clutch rollers. One or two drums may be used.

In the accompanying drawings showing, by way of example, two of many possible embodiments of the invention, Fig. 1 is a front elevation of one form of the apparatus, shown with parts broken away, the outer casing being removed to better disclose certain parts;

Fig. 2 is a left end view of the frame and appurtenant parts;

Fig. 3 is a fragmentary sectional view taken on line 3—3, Fig. 2, looking in the direction of the arrows;

Fig. 4 is a fragmentary front elevation of the right hand side of the apparatus;

Fig. 5 is a sectional view taken on line 5—5, Fig. 4, looking in the direction of the arrows, parts being shown in elevation;

Fig. 6 is a fragmentary front elevation of the means for moving the above mentioned adjustable means which may be slide wire contact and record marking means;

Fig. 7 is a fragmentary plan of the slide wire contact and appurtenant parts;

Fig. 8 is a fragmentary side elevation of the galvanometer pointer releasing and locking means;

Fig. 9 is an end elevation of the cam for moving the clutch actuating means;

Fig. 10 is a diagram of the thermocouple circuit as utilized herein;

Figs. 11 to 15 are fragmentary rear elevations showing parts of the clutch actuating mechanism in different positions;

Fig. 16 shows a bottom view partly in section of the parts shown in Fig. 15;

Fig. 17 is a sectional view taken on the line 17—17 of Fig. 12;

Figs. 18 and 19 are fragmentary diagrammatic front elevations of the clutch housing, roller and eccentric end of the clutch plate;

Fig. 20 is a fragmental front elevation showing another form of the invention;

Fig. 21 is a fragmental axial vertical sectional view showing one clutch mechanism of the form of Fig. 20;

Fig. 22 is a fragmental front elevation showing the pivoted clutch plate and associated parts;

Fig. 23 is a fragmental plan showing the parts shown in Fig. 22;

Fig. 24 is a fragmental edge elevation showing said parts;

Fig. 25 is a diagrammatic plan showing the operative connection between the clutch drums and record marker; and Fig. 26 is a side elevation, partly in longitudinal vertical section, showing, on a larger scale, details of the clamping means.

Figure 1:
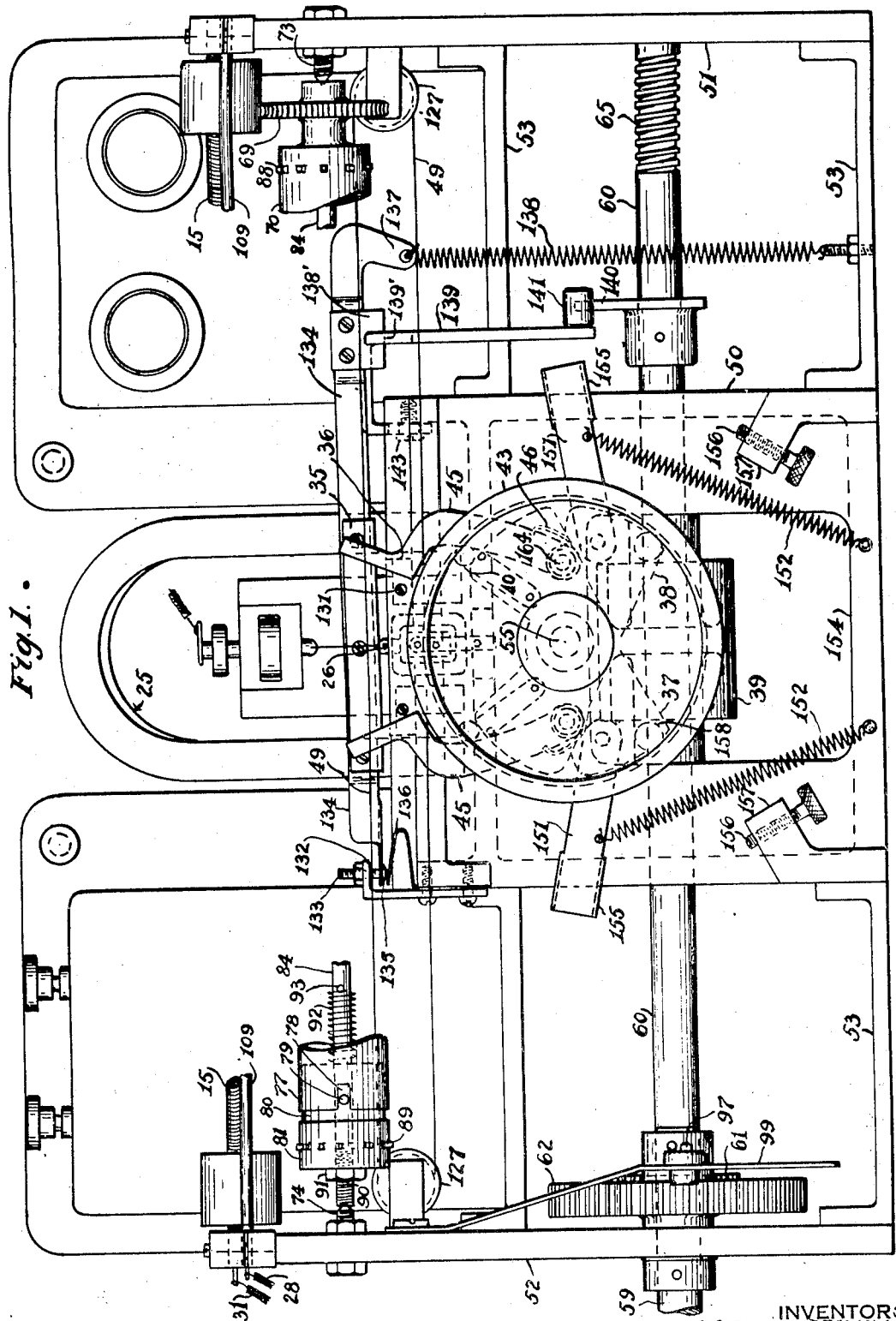

First will be given a brief description of the one-drum recorder as a whole, after which both apparatus will be described in detail.

The apparatus as a whole

A closed electrical circuit 10, 11, 12, 13, 14, 15, 16 (Fig. 10) includes an elongated contactable resistance or slide wire or bridge 15, engaged by a slidable contact device 17 (Figs. 6 and 10) longitudinally movably engageable with said resistance and carrying a translating device such as a scale indicating pointer 18 movable over a temperature scale 19 or such as a marking device 20 (Figs. 4 and 5) movable over a moving record strip 21.

A galvanometer 25 (Figs. 1, 3 and 10) provided with a deflector member 26 (Fig. 5), and a thermocouple 27 (Fig. 10) adapted to be at the temperature desired to be measured are connected by conductors 28, 29 and switch 30 in series between said contact device 17 and an end 31 of the resistance which includes the slide wire.

The thermocouple 27 is connected in opposition to the difference of potential between said device and said end, whereby said device 17 may be shifted to a balancing position where the electromotive force of the thermocouple and said difference of potential will be equal and opposite and no current or deflection will be shown by the galvanometer, and whereby if the temperature of the hot end of the thermocouple rises and the electromotive force of the thermocouple becomes greater than said difference of potential, the deflector member will deflect in a heat-increase-indicating direction, and if it becomes less, the pointer will deflect in an opposite direction. All reference herein to the temperature of the thermocouple is of course to be understood as referring to the hot or measuring end thereof.

Thus the distance of the balancing position of the device from said end 31 will increase as the thermocouple electromotive force and temperature thereof increase; and said record strip 21 or a temperature scale 19 may be calibrated to give said distances in temperatures.

Suitably operated clamping means comprising a clamping member 35 and a member including a pair of clamping bars 36 (Figs. 1, 12 and 17) alternately lock or clamp and release the deflector member; and a pair of clutch members 37, 38 (Fig. 12) are by means of a power operated cam 39 simultaneously moved equal outward excursions in respectively opposite directions to the position of Fig. 11 where the deflector member is unlocked for taking up its new position.

Clutch means such as the roller 40 and cradle 41 are carried by the members 37, 38 and are yieldably moved by springs 42 into clutching engagement with a rotary clutch drum 43 on the return movement of the members when one or the other is released by means controlled by the deflection of the deflector member.

Sensing arms 45 of insulating material on opposite sides of, and yieldably pressed by springs 46, (Fig. 1) toward, the deflector member 26 and associated with the clutch means respectively are engaged by pins 47 (Fig. 12) carried by the cradles for retracting the sensing arms during said outward excursions and for releasing them on the return movement while the deflector member is locked by the blocks 35, 36.

Each of said arms is adapted when released to move toward the undeflected position of the deflector member 26 and during such movement to press upon the pin 47 and cause the cradle to push back the roller 40 against the action of the spring 42 and disable the associated clutch means.

Each sensing arm 45 may, during said return movement, be engaged and held retracted by the deflector member 26 when deflected, as in Fig. 14, toward such arm and locked, whereby the sensing arm is held from disabling the clutch means, thereby to cause the drum to turn and move the clutched part of the drum toward the undeflected or zero position of the deflector member.

An operative connection such as the cable 49 (Fig. 6) is provided between said drum and contact device 17 for moving the contact device 17 in the direction to indicate a higher temperature when a sensing arm is held retracted by the deflector member when deflected in heat-increase-indicating direction, and for moving the device in the reverse direction if the deflector is deflected in said opposite direction.

It will thus be seen that when the galvanometer deflector member is deflected in heat-increase-indicating direction, that the clutch means is caused to operate to move the contact device 17 and scale indicating pointer or marker in a direction to establish equilibrium of potential forces and in a direction denoted as a higher temperature on the scale 19 or record strip 21. The reverse movement takes place if the pointer is deflected in the opposite direction.

The apparatus and its operation will now be described more in detail.

The apparatus frame

Referring particularly to Fig. 1, the various mechanisms of the apparatus are shown mounted on a suitable structure composed of a central casting 50, a right side frame 51, and a left side frame 52 which are joined together by spacing members 53.

The central casting carries on its uppermost portion the galvanometer 25 and its deflector member clamping blocks 35, 36. This central frame also rigidly supports on its front part a pivot pin 55 (Figs. 1 and 17) carrying the clutch drum 43 forming a clutch housing enclosing the coacting mechanism 37, 38, 40, 45 for actuating the slide wire contact device 17 and record marking means.

The power drive mechanism

A short shaft 59 (Figs. 1 and 2) (Fig. 2 and left of Fig. 1) rotatably carried in a bearing in the lower part of the side frame 52 is adapted to be driven by a suitable motor (not shown) and to cause rotation of a main shaft 60 by means of a gear 61 attached to the short shaft and a pinion 62 attached to the main shaft. The main shaft extends through bearings in the left side frame 52, the center casting 50 and right side frame 51.

The clutch actuating cam 39 is secured to the said main shaft—and located between the two bearings of the center casting.

The record feed drive

The main shaft 60 has a threaded portion 65 (Fig. 1) at its extreme right end, which by means of the worm gear 66 (Fig. 4) in mesh with said threads, a counter shaft 67, and a worm 68 thereon, drives a worm wheel 69 on the record roll 70. Said counter shaft is rotatably held in position by brackets 71, 72 mounted on the right side frame 51.

The record feed roll

The record feed roll 70 (Figs. 1, 2 and 4) is shown supported between the right and left side frames 51, 52 on pivot bearings 73, 74 adjustably mounted in place in said side frames.

The feed roll 70 is shown as being of substantially cylindrical construction, and has one bearing end 75 fast thereon and carrying the worm gear 69. The opposite end 77 (Fig. 1) of said feed roll is tubular and has opposite slots 78 formed therein (only one being visible on Fig. 1). These slots receive pins 79 located on the reduced part 80 of an adjustable end piece 81. Said adjustable end piece is slidably mounted upon an axial rod 84 which is fastened in said bearing end 75. This end piece can be moved longitudinally on the rod and locked in position, to adjust the distance between the teeth formed on the opposite ends of roller, as will be explained.

The paper record strip is perforated as at 87 (Fig. 4) along its edges to receive the teeth 88, 89 (Figs. 1 and 4) formed at the ends of the feed roll. It has been found that the paper varies in width due to weather changes. Therefore, by making an adjustment of the length of the feed roll, the teeth for engaging the paper may be made to mesh properly.

The feed roll adjusting rod 84 has a threaded portion 90 (Fig. 1) and a lock nut 91 thereon, at its pivot end; and by turning the lock nut, the end piece may be made to slide along the rod. The teeth of the opposite ends will remain in alignment with each other because the pin in the end piece is guided by the slot in the tube.

There are also a spring 92 and spring stop 93 on the adjusting rod, adjacent and bearing on the end piece which keeps the end piece pressed against the lock nut 91.

Record strip supply means

A supply roll 95 of record paper 21 ruled for recording purposes and accurately perforated for feeding is shown in Figs. 2, 4 and 5. This roll is rotatably carried on pin bearings 96, 97 (Figs. 1 and 4) and is held in proper alignment by an adjustable screw pin 98 at one end and a flat spring 99 carrying the pivot pin 97 at its other end, which spring 99 will supply sufficient tension to the paper roll to prevent rapid unwinding. The paper passed up from the supply roll and over the feed roll as shown in Figs. 2, 4 and 5.

A pressure bar 100 is provided to insure the paper against looseness while passing over the top of the feed roll and also to insure accurate feeding, and is shown in Figs. 4, 5 as having an intermediate part extending lengthwise over the feed roll and a portion 101 bent outward to clear the teeth of the feed roll, and having ends 102 bent inwardly and joined to the side frames by pivot screws 103 to hold the bar in position.

The record marking device

The slide wire 15 and contact device 17 are disposed back of the feed roll as shown in Figs. 4, 5, 6 and 7. The marking writing unit comprises an inclined ink well 105 (Fig. 5) having ink therein and a capillary tube forming the marking element or device 20 securely held in the cover 106 of the ink well and its outer end bent as a hook and resting upon the paper near the pressure bar 100.

Said unit is slidably supported by rods 108, 109, of which the rod 108 acts as a guide and holding means for the unit and rod 109 acts as a support and is connected to the thermocouple by a lead wire and serves therewith as the conductor 28 (Fig. 10) for connecting to the slide wire 15.

The guide rod 108 is securely fastened to the side frames 51, 52, while the rod 109 is supported in a bracket of hard desirable insulating di-electric material comprising upper and lower blocks 110, 111 fastened to the top of the side frames by screws 112.

The marking unit includes a slidable member 115 (Fig. 7) which has two bent portions 116 to engage around the rod 108, and two upwardly bent sides 117 securely holding a rectangular piece 118 of hard insulating material. The upwardly bent sides extending beyond upper end of said piece to form arms to pivotally hold the ink well 105 therebetween.

Securely fastened to the insulating piece is contact plate 120 of spring material, bent in U-shape to form one arm 121 (Fig. 5) to make contact with the rod 109. The other arm 122 carries a thick round end piece 123 which engages with the slide wire 15.

The marking and contact device actuator

On the lower side of the slidable member is a downwardly bent square part 125 (Figs. 5 and 6) to which the cable or wire 49 is secured by a locking screw 126. The cable extends from both sides of the slidable member to grooved pulleys 127 (Fig. 6) which are supported by the side frames 51, 52, and thence back to the clutch housing or drum 43, where each end of the cable makes a full turn around the drum and is secured to the housing by a screw 128 (Fig. 6).

It will be seen from the foregoing that as the clutch housing is turned in either direction by the clutch mechanism later to be described in detail, a sliding action will be imparted to the marking member 20.

The galvanometer pointer clamping mechanism

Before describing the clutch mechanism, the mechanism for causing the intermittent clamping of the deflector member 26 will be described.

As the deflector member is very delicate, and the forces moving it very small, it cannot be depended upon to do any real work more than to assume its different positions under the influence of the currents passing through the conductors 28, 29 of Fig. 10. After it has assumed its position, it is locked, and in the locked position controls the clutch mechanism.

As the galvanometer is very sensitive to small currents it is essential to insulate it from all electrical influences outside of the galvanometer thermocouple circuit. Therefore the clamping members 35, 36 and the arms 45 are made of insulating material.

Referring to Figs. 1 and 17 it will be noted that the central frame has an outwardly projecting ledge 130 (Fig. 26) at its upper portion on which is mounted the rectangular member or fixed block 36 of hard insulating material secured by screws to the upper part of the central frame 50 and having upper longitudinal groove 131 therein forming parallel top bearing faces.

An upright fulcrum bracket 132 on said frame has an overhanging end portion provided with a vertical tapped opening receiving a threaded pin 133 having a locking nut thereon engaging said portion and having a lower substantially hemispherical pivot end 133' (Fig. 26).

A clamping lever 134 disposed over said block in a substantially vertical plane has a flat substantially horizontally disposed inner end provided with a down pressed portion 135 forming a concaved pivot face engageable with said pivot end, and a lower convexed face engaged by a flat spring 136 having its lower end secured between said bracket and frame, the spring being bent outwardly and backwardly to engage under said convexed face to press the concaved face against said pivot end, thereby to releasably hold the clamping lever and permit lateral and longitudinal rocking movement thereof.

The clamping bars 35 are secured on the front and rear faces of said lever arm and project slightly below the arm to form a pair of bottom clamping faces opposed to said top faces, the deflector member 26 being disposed between said block and bars.

The clamping lever 134 is formed with a downturned outer end portion 137 projecting below the plane of said bottom faces, and has connected thereto a spring 138 tensioned between said portion and the lower spacing piece 53, whereby the clamping bars are drawn down to seat firmly on the deflector member and hold it in firm engagement with said block 36 at any lateral angle of the deflector member.

An engagement plate 138' secured on said lever arm near said downturned end and projecting below the plane of said bottom faces of the bars 35, but terminating short of a line between said downturned end and the pivot point of the arm, is adapted to be received in a V-notch 139 provided in the upper edge of a lifting lever 139 pivoted on said frame, whereby when the lifting lever is raised, the clamping bars 35 free the deflector member 26 and are automatically righted, should they have been laterally tilted in either direction.

A clamp operating cam 140 (Fig. 1) adjacent the center casting and securely fastened to the said main shaft 60 co-operates with a roller 140 carried by the lifting lever 139 (Figs. 1 and 5) pivoted as at 143 to the upper part of the center casting. This cam 140 is designed to give a lifting action to the galvanometer lock bars 35 at each revolution of the main shaft to permit the deflector element 26 to assume a position in accordance with the current in the conductors 28, 29 of Fig. 10.

At the beginning of travel of the clutch plates toward the undeflected position of the deflector member 26, the cam 140 permits the spring 138 to cause the clamping of the pointer.

The clutch mechanism

Figs. 11 to 19 show the internal mechanism of the clutch housing drum which is actuated by the cam 39 and controlled by the galvanometer deflector member in accordance with different positions of said member.

In Figs. 15 and 16 a fragment of the clutch housing or drum 43 is shown engaging against the tubular member 145, (Fig. 17) carried on the pin 55, and serving as a bearing for the two internal clutch plates 37, 38. The flange 146 on the member 145 holds the plate 37 from contact with the drum.

The clutch plates

The two clutch plates, only one of which is shown in Fig. 15, are both similar in construction, except they are made as right and left and are crossed and recessed as at 147 (Fig. 17), so they may be able to nest together for free independent scissors movement. Each plate is formed in an irregular shape with one concentric end 148 (Fig. 15) the other end 150 being so shaped as to form with the inner rim surface of the clutch drum, the drum clutch face, an operative varying dimension measured normal to either clutch face. In Fig. 15 the clutch face of the clutch plate is shown as being eccentric to the clutch drum clutch face.

The object of using the curved surface 150 is so that rollers of varying diameter will give identical action with identical forces, or what amounts to the same thing, variation in dimensions of driving or driven member will not affect the clutch action forces. Such a surface imparts to the clutch the property of being self adjusting, which cannot be realized with a plane surface.

Secured fast on the concentric end 148 of each clutch plate is an outstanding arm or lever 151 having a spring 152 (Figs. 1 and 12) tensioned between said lever and the base 154 of the center casting, thereby to draw the arm downward and rotate the clutch plate.

There is also, at the end of the lever arm a rearwardly bent portion 155 (Fig. 16) adapted when the said arm is drawn down to engage with an adjusting stop screw 156 (Fig. 1) held in a lug 157 cast upon the center frame.

The concentric end of each clutch plate carries a roller 158 (Fig. 12) held by the spring 152 and lever arm against the opposite contours 159 of the clutch cam, shown by the dotted lines 159 of Fig. 12. The action of the clutch plates will be scissor like during the rotation of the main shaft and clutch actuating cam 39.

The clutch rollers and cradles

On the eccentric end of each clutch plate (Fig.

15) is the clutch roller 40 held in place by the guide arm or cradle 41 and the spring 42. The guide arm is held by a pivot pin 160 (Fig. 15) to the clutch plate, has a U-shaped portion 161 (Figs. 16 and 17) at its outer end formed to guide the roller. The guide arm also carries fast thereon the engagement pin 47 (Fig. 12) located so as to be engaged by the adjacent one of the galvanometer deflector member sensing arms 45.

A stop pin 163 (Fig. 15) fast on the clutch plate, limits the forward movement of the guide arm or cradle against the action of the spring 42 securely mounted on the upper side of clutch plate and located to bear against the roller and force it in a downward direction against the eccentric surface of the clutch plate and also backwardly against yoke of the U-shaped portion of the cradle.

When the clutch plate is in the position of Fig. 11, this spring 42 is ready to force the roller and roller guide plate back unless held forward by the engagement pin being in contact with the inner edge of the sensing arm 45.

The sensing arms

The galvanometer deflector member sensing arms 45 may be made of flat fibre stock or other insulating material and are pivoted at a suitable point on the center casting by shoulder screws 164 and are yieldably moved toward each other by coiled springs 46 (Fig. 1) wound around and held by the said shoulder screws.

The upper ends of the springs 46 bear against the outer edges of the sensing arms, to move the arms together toward each other and against the engagement pins 47 (Fig. 12) on the cradles.

Operation of the paper feed

Each revolution of the main drive shaft is a cycle of action of the apparatus, and the record paper feed roll being directly connected to the drive shaft by the countershaft 67 (Fig. 4), worms and worm wheels, a constant feed will be maintained by the paper, which enables the marking means to chart with a continuous line the various temperatures at the thermocouple.

Operation of the clutch mechanism

Under the condition of Fig. 11, there has been no change in the temperature since the previous cycle and the galvanometer deflector member 26 is shown in a central or zero position, and the clamp operating cam 140, is so positioned that the clamp bar is in a raised position above the galvanometer deflector member allowing the deflector member free movement but as there is now no temperature change, the deflector member does not move.

At this time, the clutch actuating cam 39 is in a position to hold the clutch plates in an open position. In this position the sensing arms 45 are also held in an open position by their contact with the pins 47 on the roller guide arms 41, and by the force exerted by the sensing arm springs 46 (Fig. 1) hold the clutch rollers 40 out of clutching contact with the drum. After an interval the clamp bar, the clutch cam and the clutch plate move to the position of Fig. 12.

Fig. 12 shows the position of the clutch plates 37, 38 and sensing arms 45, after the main shaft has turned a distance to allow the clutch plate rollers 158 to be drawn into the deeper portion of the cam contour 159 of the clutch actuating cam, by the action of the springs 152, attached to the extended arms 151; but as no temperature change has taken place the galvanometer deflector member is still in the zero position as in Fig. 11; but clamping bars 35 have moved to their downward position holding the deflector member stationary, while the sensing arms have found the deflector member. But this has caused no rotation to the clutch housing drum 43 in this particular action; because the sensing arms all the time drawn inward by their springs 46 have kept the clutching rollers 40 out of clutching contact with the drum.

Fig. 14 shows another cycle of the apparatus in which there has been a temperature change and the deflector member 26 has assumed a new position to the left. The main shaft and clamping bars are in the same clamping position as that shown in Fig. 12, but one of the sensing arms has returned to its central position under the action of its spring 46, without causing clutching, but the opposite arm has been stopped by the locked galvanometer deflector member in its new position to the left.

It will be noted that both clutch plates have returned to their central position, but in so doing the clutch roller of clutch plate on the left hand side with the stopped sensing arm has not been held out of clutching engagement with the drum; for the sensing arm stopped by the pointer has remained behind and has permitted the clutch roller spring 42 to push the roller back on the eccentric portion 150 of the clutch plate into clutching engagement with the drum and will cause the clutch housing to move in the direction of the arrow an angle approximately equal to the angle X, this being the angle between the position of the pin 47 when it left the sensing arm and the final position.

In said movement the clutch housing was actuated by the clutching of the inside surface of the clutch housing with the clutch roller 40 and the eccentric surface 150 of the clutch plates (Fig. 18); and the stopping of one of the sensing arms released its pressure against the roller guide pin 47 allowing the flat spring 42 of the clutch plate to exert a pressure against the roller to move it from the position of Fig. 19, to that of Fig. 18.

It will now be clearly understood that the downward pull of the tension springs 152 on the extended arms of the clutch plates will cause the clutch housing to revolve in either direction, or a further movement in the same direction, depending upon which sensing arm has been stopped by the galvanometer pointer.

A similar action is shown in Fig. 13, wherein the galvanometer pointer has been deflected in the opposite direction and the opposite sensing arm, has been stopped. Therefore in this case the clutch housing has rotated in the opposite direction.

Referring to Fig. 6 it will be understood that any turning action of the clutch housing will impart a movement to the cable 49 and the marking unit; and thereby an accurate record will be made on the paper roll of any change in temperature of the thermocouple. As stated, the marking unit carries the slide wire contact 17 and therefore any movement of the unit will tend to bring about a state of balance between the electromotive force of the thermocouple and the automatically adjusted potential difference of the included portion of the slide wire, and allow the galvanometer pointer to return.

The closed electric circuit of Fig. 10 includes a source of current 10, an adjustable resistance or rheostat 11, a conductor 12, a known resistance 13, the slide wire or bridge resistance 15 and the conductor 16. The resistances 11 and 13 may be so adjusted and selected that the normal limits of heat upon the couple 27 will cause the indicator 18 or marker 20 to stay on the scale 19 or record strip 21. The conductor 31 may be an extension of the slide wire 15.

In use the switch arm of the switch 30 engages the contact 167, but may be caused to engage the contact 168 to connect the galvanometer in series with a standard cell 170 by means of conductors 171 and 172.

The standard cell is connected in opposition to the drop around the resistances 13 and 15 to permit the resistance 11 to be adjusted to give zero reading on the galvanometer, thus testing for any variation of the voltage of the source 10 or any other factor which might cause this drop to vary. Thus it is possible to keep the drop of potential over the active portion of the slide wire 15 at a predetermined value, to insure against variations in the accuracy of the readings.

The two drum apparatus

In the apparatus of Figs. 20 to 25, the galvanometer 25, the deflector member 26, the clamping bars 35 and block 36 and the main shaft 60 are similar to those of the apparatus of Figs. 1 to 24; and the connections similar to those of Fig. 10 are used therewith.

In the two-drum apparatus the center casting 200 is provided with a pair of bores 201′ (Fig. 21) receiving spindles 201 secured in said bores with a force fit and provided with a reduced outer end portion 202 and an intermediate portion 203 of intermediate diameter.

A pending cam-plate operating arm 205, and a cam-plate 206 are pivoted on the intermediate portion. The arm 205 is provided with a bearing hub 207 on which is pivoted one of the sensing arms 208 disposed on opposite sides of the pointer 26 and connected by a spring 209 for yieldably pressing the arms toward the pointer.

An adjusting screw 210 carried in ears 211, 212 on the actuating arm and the clutch plate respectively adjustably connect the latter.

The cam plates 206 are provided with end faces 215 (Fig. 20) similar to the faces 150 (Fig. 15) progressively curved away from the drums 216, 217 respectively in the direction of rotation of the drum, the drums rotating in the direction of the arrows 218, rollers 219 on the lower ends of the actuating arms are engaged by a pair of cams 220 on the main shaft 60 engaging said rollers for positively rotating the clutch plates in their active directions, which are the directions of said arrows.

A spring 222 connects the lower ends of the actuating arms 205 for yieldably moving the clutch plates on the return stroke.

Clutch rollers 225 on said eccentric faces 215 are engaged by springs 226 yieldably pressing the rollers back into clutching engagement with the clutch face; and cradles 227 (Fig. 22) have arms disposed on opposite sides of the clutch plates and fast on a pivot pin 228 carrying a disk 230. The cradle has guide portions 231 (Fig. 23) engaging and guiding opposite ends of the rollers, and has a yoke 232 adapted to engage the side of the roller opposite the spring.

Brackets 234 on the casting 200 are adapted to engage eccentric pins 235 in the disks 230, at the end of the inactive stroke of the clutch roller, to rock the cradle to cause the disengagement of the roller 225 by the cradle at the beginning of the active stroke. The disk 230 at the inner side of the cradle is adapted to be frictionally or otherwise engaged by the sensing arm 208 when the latter is not held retracted by the deflected pointer, to cause the sensing arm to frictionally hold the previously rocked cradle in the direction of the spring 226, to cause the yoke 232 to hold the clutch roller inactive and out of clutching engagement. If however, the sensing arm is not held back by the pointer the friction of the arm on the disk 230, holds the cradle and roller in inactive position.

An annular shoulder 238 (Fig. 21) concentric on the outer face of each drum rotatably receives an annular grooved pulley 239 caused to yieldably rotate with the drum by a friction spring 240 carried on the drum and engaging the pulley.

A cable 241 carried entirely around the drums and connected to the engagement device 17 (Fig. 25) cooperates with the drum, said spring 240 and associated parts to yieldably move the device 17.

The operation of the two-drum apparatus

The two-drum mechanism is similar to the operation of the one drum device, except as hereinafter specified.

At the end of the inactive stroke, the bracket 234 (Fig. 23) engages the pin 235 and causes the cradle yoke 232 to push the clutch roller against the spring 226 out of clutching engagement. If the deflector member is not deflected toward the side of the machine of the cradle in question, the sensing arm on that side frictionally engages the disk 230 with sufficient friction to hold the cradle in its roller-retracting position.

However, should the pointer be deflected toward said side of the apparatus, the instant the sensing arm reaches the deflector member, the disk 230 leaves it and is no longer held against rotation, and the spring 226 instantaneously pushes the clutch roller into clutching engagement.

Should the clutch drum be considerably out of round, the operation is still accurate, since the operation of the spring 226 is substantially instantaneous; and the clutching time of the clutch roller begins as soon as the deflector member is touched by the sensing arm.

Therefore the length and distance of movement of the clutch roller in action is substantially proportional to the amount of deflection of the deflector member 26 however much of the clutch drum may be out of round.

This permits a very light drum, reducing cost, momentum and power.

In the two drum apparatus, the active stroke is a positive drive by the cam 220, and the return stroke which is not a working stroke, may be very short under the action of the spring 222 and during the working time of the cam 140. Therefore nearly all of the rotation of the cams may be given to active work, permitting long cams and a shorter cycle an requiring little power.

The two drums permit the effective use of the friction of the spring 240 (Fig. 21). If the clutch rollers are both accidently engaged during the same stroke, as may happen during adjusting or cleaning, the spring 240 permits the clutches and pulleys 239 to rotate independently, preventing damage.

We claim as our invention:

1. In combination, a feed roll provided at one end with a series of peripheral sprocket teeth and an axial bearing; the other end of the feed roll having a cylindrical cavity recess, open at the outer end forming a cylindrical wall having longitudinal slots in the edge; a rod mounted in the roll and disposed axially of the roll and recess and threaded at its outer end portion and provided with an end bearing portion; an end piece slidable on said rod and provided with sprocket teeth alined with the other sprocket teeth, and formed with a reduced portion slidable in said cavity; radial pins mounted in said reduced portion and engaged in said slots; a spring on the rod compressed between the roll and piece; and an adjusting nut on the threaded portion.

2. In combination, a feed roll adapted to receive thereon perforated paper and comprising co-axial relatively adjustable end pieces provided with sprocket teeth for engaging in the perforations; and means including a spring and having a single member operable contiguous to the exterior face of one of said end pieces and acting against said spring, for adjusting the pieces toward and from each other.

3. In combination, a feed roll provided with sprocket teeth at one end, an end piece adjustably slidable co-axially at the other end of the end piece and provided with sprocket teeth alined with the other sprocket teeth; a spring pressing the end piece outwardly and means for constraining said end piece to move inwardly.

4. In combination, a feed roll provided at one end with sprocket teeth and bearing means; a rotary rod mounted axially at the other end and provided with a bearing portion; an end piece adjustably slidable on said rod and provided with sprocket teeth; a spring on the rod pressing against the inner face of the end piece; and a nut carried on the rod and engaging the outer face of the end piece for adjusting the end piece.

5. A feeding device for a perforated web comprising in combination a roll including a central portion, opposed relatively movable ends peripherally flush with said portion and having aligned teeth, resilient means urging one of said ends outwardly, and adjustable means for moving the last mentioned end with its teeth inwardly, whereby to engage said teeth in the perforations.

6. A feeding device for a perforated web comprising in combination a revolvable rod, a roll rigid with said rod and including a central portion having at one of its terminals a cavity through which said rod passes, sprocket teeth carried by the other terminal of said roll, an end piece having axial movement on said rod and disposed at the first mentioned terminal, said end piece having sprocket teeth aligned with the first mentioned teeth, a spring mounted on said rod in the cavity and urging said end piece outwardly, and adjustable means also mounted on said rod and cooperating with the outer end of said end piece for moving the latter, whereby to engage said teeth in the perforations.

7. A feeding device for a perforated strip comprising in combination a revolvable rod, a roll rigid with said rod and including a central portion having at one of its terminals a cavity through which said rod passes, said terminal having therein a slot, sprocket teeth carried by the other terminal of said roll, an end piece axially movable on said rod and having a reduced portion in part of said cavity, a pin carried by the last mentioned portion and disposed in the slot, said end piece having sprocket teeth aligned with the first mentioned teeth, a spring mounted on said rod in the cavity and urging said end piece outwardly, and adjustable means also mounted on said rod and cooperating with the outer end of said end piece, whereby to engage said teeth in the perforations.

8. A feeding device for a perforated strip of contractile and expansible material comprising in combination a revolvable rod, and means mounted on said rod for contracting and expanding with said material, said means comprising a roll which is rigid with said rod, said roll including a central portion and having at one of its terminals a cavity through which said rod passes, said terminal having therein a slot, sprocket teeth carried by the other terminal of said roll, an end piece axially movable on said rod and having a reduced portion in part of said cavity, a pin carried by the last mentioned portion and disposed in the slot, a spring disposed in said cavity and engaging the reduced portion of said end piece to urge the latter outwardly, means for limiting the outward movement of said end piece, and sprocket teeth carried by said end piece and aligned with the first mentioned teeth, said teeth adapted to engage in the perforations.

9. A feeding device for a perforated web including in combination a frame, a revolvable rod having end bearings, adjustable means carried by said frame and engaging said bearings, a roll rigid with said rod and having at one terminal thereof sprocket teeth, an end piece movably mounted on said rod at the other terminal of said roll and having thereon sprocket teeth which are aligned with the first mentioned teeth, resilient means urging said end piece outwardly, and adjustable means for moving said end piece inwardly, whereby to engage said teeth in the perforations.

EDWARD WILLIAMS.
FRANK MOORE.